US005593772A

United States Patent [19]

Zamot

[11] Patent Number: 5,593,772

[45] Date of Patent: Jan. 14, 1997

[54] WALL CONSTRUCTED TO REDUCE THE IMPACT OF VISUAL IMPERFECTIONS

[76] Inventor: Daniel Zamot, 9569 E. Beach St., Bellflower, Calif. 90706

[21] Appl. No.: 130,377

[22] Filed: Oct. 1, 1993

[51] Int. Cl.[6] .............................. B32B 5/16; B32B 35/00; B05D 3/00

[52] U.S. Cl. .................... 428/323; 106/287.35; 106/401; 106/499; 427/140; 427/444; 428/325; 428/411.1

[58] Field of Search ................................ 428/411.1, 323, 428/325; 427/136, 137, 140, 444; 106/802, 287.35, 401, 493, 499

[56] References Cited

U.S. PATENT DOCUMENTS

| | | | |
|---|---|---|---|
| 4,009,136 | 2/1977 | Lewandowski et al. | 428/164 |
| 4,031,048 | 6/1977 | Holmen et al. | 427/136 |
| 4,428,994 | 1/1984 | Rawlins | 428/164 |
| 4,716,056 | 12/1987 | Fox et al. | 427/407.1 |
| 4,752,502 | 6/1988 | Winchester | 427/137 |
| 5,039,745 | 8/1991 | Riddle | 525/101 |
| 5,041,517 | 8/1991 | Vu et al. | 528/60 |
| 5,132,138 | 7/1992 | Trifon et al. | 427/140 |

*Primary Examiner*—Hoa T. Le
*Attorney, Agent, or Firm*—John F. Sicotte

[57] ABSTRACT

A structure constructed to reduce the impact of visual imperfections having at least one visible surface which is covered by a first basecoat of an exterior water-based flat paint. The first basecoat is then covered by a layer of multicolor paint. Upon the incidence of the surface being visually marred, for example by graffiti, a second basecoat, similar in hue to the first basecoat, is applied over the portion of the surface that had been marred. A second layer of multicolor paint, similar in hue to the first layer of multicolor paint, is then applied over the second basecoat. The ability of the first basecoat to adhere to the structure may be enhanced by the addition of concrete glue to the flat paint. In addition the multicolor paint may be made reflective by the addition of glass beads or particles to both first and second layers of multicolor paint prior to its application. Another method of making reflective multicolor paint is to add reflective paint particles to the darker or speckled portions of the multicolor paint.

17 Claims, 3 Drawing Sheets

WALL CONSTRUCTED TO REDUCE THE IMPACT OF VISUAL IMPERFECTIONS

BACKGROUND OF THE INVENTION

The present invention relates in general to the construction of structures that have a surface which reduces or can be repaired to reduce the impact of visual imperfections and, more particularly to walls that have at least one surface that has been marred or defaced by graffiti.

1. Review of the Prior Art

Prior to this invention, the appearances of structures, such as walls, telephone poles, or guardrails that had been defaced by graffiti, were improved by simply painting over the markings with paint. Often times these treatments were just as disturbing to the human eye as the original graffiti. This particularly true in areas where has been multiple repairs of a surface. The end result of these repairs is a multitude of varying color patches of paint which overlap one another. A similar result occurs if someone attempted to remove graffiti by water or by sand blasting. The surface of the wall would still exhibit varying shades of cement where the paint and some of the cement was removed. Other methods of graffiti removal which are currently being tried are baking soda blasting, walnut blasting and laser blasting. More indirect methods of preventing graffiti include covering the walls with ivy (real or plastic) and installing motion detectors which are used in conjunction with water sprinkles to inhibit the perpetrators of graffiti.

Another suggested means for treating a surface that has been marred by graffiti involve covering over the marks with a water based epoxy. After the epoxy is dried a top coat is applied which is designed to facilitate the removal of later applied graffiti. This method is described in a patent issued to Frank Fox et al, U.S. Pat. No. 4,716,056.

A similar approach is suggested in U.S. Pat. No. 5,039,745 issued to Robert Riddle which describes a paint composition that is applied to a surface and forms a non-stick surface. The object of the composition was to facilitate the removal of graffiti and permit the use of strong solvents.

Unfortunately, nearly all of these prior art techniques, including certain types of paint, require that the painting be done only outdoors. Some methods depend on sand blasting or water blasting to remove graffiti, while other methods include the use of volatile chemicals and solvents which may create a hazardous or a mess. The present invention is not limited to exterior areas in that it may be used to treat interior walls such as gymnasiums without creating a hazardous or a messy situation.

Solutions suggested by the prior art, as well as the traditional cover-up approach to dealing with graffiti, are cumbersome and ineffective. The human eye will still perceive that something has been applied to the wall's surface, that was not part of the original surface of the wall. In effect, the remedies to the graffiti problem are just another form of eye pollution that the eye will easily detect.

The present invention overcomes this problem of the prior art by constructing a surface that is covered with a multicolor paint applied over a color basecoat. If the surface is marred by graffiti and the area can be easily covered with a matching basecoat and then that new basecoat is covered with more multicolor paint that matches the original multicolor paint. The net effect is that the human eye will not perceive any differences between the original multicolor paint with an undercoat and the second coating of the same materials, due to the speckled or mottled nature of multicolor paint.

2. Summary of the Invention

The present invention involves the construction of a structure having one visible surface in such a manner that later attempts to cover over graffiti will be unnoticeable to the human eye. The surface is covered with a basecoat of flat paint which is coated with a multicolor paint. If graffiti should occur, the graffiti is covered over with a second basecoat that is similar in hue to the original basecoat and the second basecoat is covered with a new coat of multicolor paint that is similar in color to the original coat. The adherence of the original basecoat may be enhanced by the addition of concrete glue to the basecoat. Also, the multicolor paint may be made reflective by the addition of glass particles or glass beads to the multicolor paint. Another method of making reflective multicolor paint is to add reflective paint particles to the darker or speckled portions of the multicolor paint.

The method of constructing the invention includes preparing the surface. If the surface of the structure to be treated is adjacent to a highway, such as a concrete soundwall, a bridge, or a guardrail, then it should be pretreated for painting by one of the appropriate methods known in the art. Badly weathered or rough surfaces might require scraping, brushing or water blasting to remove any material which may later undermine paint adhesion. Once the surface has been prepared, it is then ready to be coated with a basecoat of water based paint having a pastel hue. Thereafter, a coating of multicolor paint is applied over the basecoat. The multicolor paint is chosen to be of similar hue to the basecoat with splotches of pigment that are the same color as the basecoat, but a darker shade. Upon the occurrence of defacement by graffiti, a second basecoat is applied only over the defaced portion of the exterior wall. Once the graffiti is completely coated, a second multicolor coating is applied over the second basecoat and the areas immediately surrounding the second basecoat.

One object of the invention, therefore, is to provide a structure having a visible surface which is easily repairable should it become impacted with graffiti.

Another object of the invention is the provide a structure which is cost efficient to repair.

A further object of the invention is to provide a method for construction and repair of a structure which is safe and time sufficient.

The novel features of construction and operation of the invention will be more clearly apparent during the course of the following description, reference being made to the accompanying drawings wherein has been illustrated a preferred form of the structure of the invention and wherein like characters of reference designate like components throughout the drawings.

DESCRIPTION OF THE PREFERRED EMBODIMENTS

Figure 1:
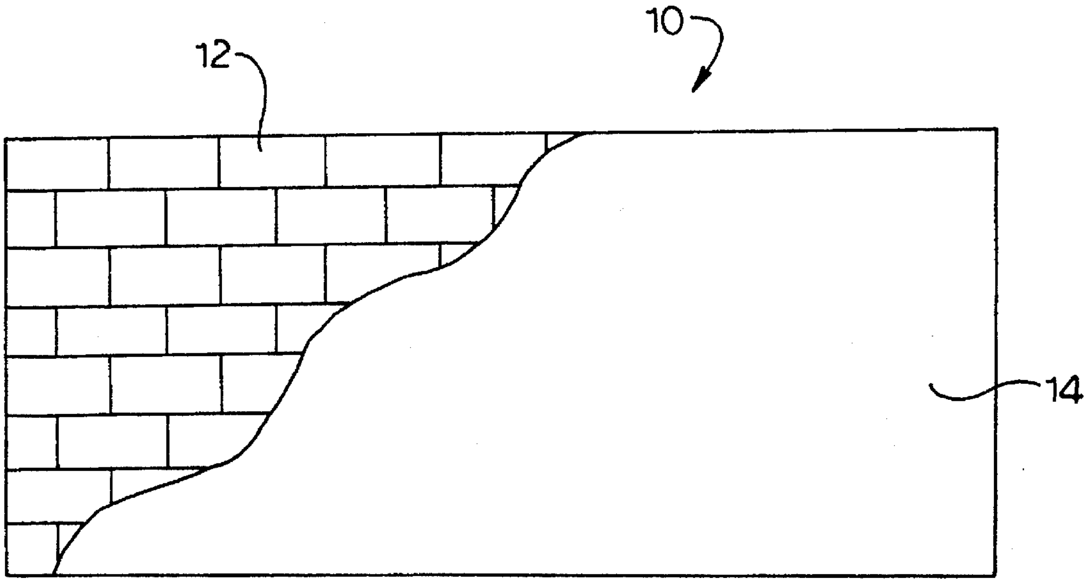
FIG. 1 is an elevational view of a concrete block wall that has been partially covered with an basecoat.

Referring now to the drawings, FIG. 1 is an elevational view of a structure in the form of a concrete wall that is partially constructed according to my invention. The wall 10 includes concrete blocks 12 which have been partially covered with a first basecoat 14 of flat paint. The use of a basecoat is necessary to the invention for several reasons. It provides a sealing layer for covering over other paints, such as graffiti, which may bleed through a finish layer. It provides an adhesion layer for subsequent layers of multicolor or flat paint which might not adhere to the surface of the structure. The paint used for a basecoat can be any type of flat paint. In the preferred embodiment the paint used for the basecoat was a modified acrylic latex flat paint marketed by the Grow Group, Inc. under the trademark "Meritone Paint PA 750 Series". It may be applied using an airless sprayer. The high pressure of the spray gun will cause the base coat to imbed itself into the surface of the structure. This provides a uniform surface for Multicolor paint, which cannot be applied using high pressure due to its composition. Thus, multicolor paint it does not have the ability to penetrate the surface as well. Lastly, a basecoat, which has been applied to differing surfaces will have differing absorption rates. Surfaces which are vastly different in porosity, such as concrete, wood and metal, need to be basecoated in order to have a uniform absorption rate, Without this uniform absorption rate, subsequent repairs would be more apparent, defeating a primary objective of this invention. In the preferred embodiment, a flat exterior paint is used for the basecoat that has a pastel color or hue. The preferred colors are ones that will blend with the surrounding environment. An example is a concrete wall that is to be placed along a highway should be covered with a basecoat that has a gray hue. Other suggested colors are green or light brown. In addition to insuring compatibility to the surrounding environment, a pastel color will also provide the advantage of the coating will fade less as a result to exposure to sunlight.

Figure 2:
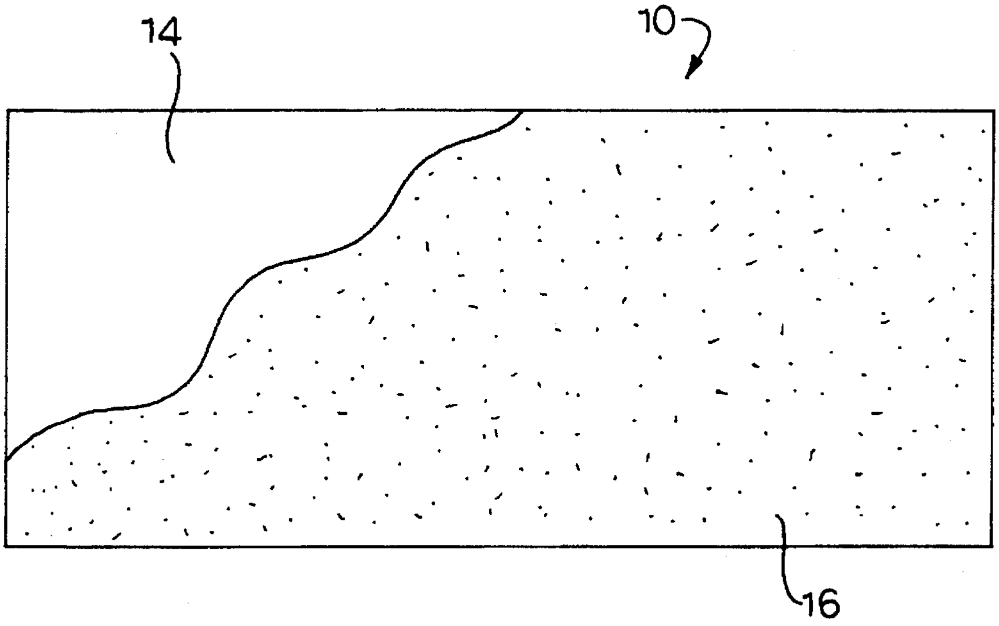
FIG. 2 is the wall of FIG. 1 completely basecoated and partially covered with multicolor paint.

FIG. 2 shows the structure in the next phase of development. Concrete wall 10 has been completely covered with basecoat 14 which is shown partially covered with a layer of multicolor paint 16, which is preferably the type produced by Surface Protection Industries under the trademark "Zolatone 20" which is a polychromatic acrylic waterbase line of paint. Normally the Zolatone waterbase line has automotive, industrial and marine uses. This product has the advantage of being very durable upon exposure to weather in that it contains cellulose fibers. It also bonds well to the suggested basecoat. Its disadvantage is that it cannot be used with airless spray equipment. In light of this, it is recommended that the multicolor coat be applied with High Volume Low Pressure (H.V.L.P.) spray equipment with a large orifice fan tip for walls. An alternative to the Zolatone waterbase line would be another multicolor paint that can be used with airless spray equipment. An example would be a modified vinyl multicolor paint manufactured by Multicolor Specialties, Inc. under the trademark "Multicolor Fine Fleck" which provides a finer grain mottled appearance. An even finer finish, something like granite, can be achieved by using a product of Plastikote Co., Inc. sold under the trademark "Fleck Stone" Fleck Stone for the multicoat layer.

Figure 3:
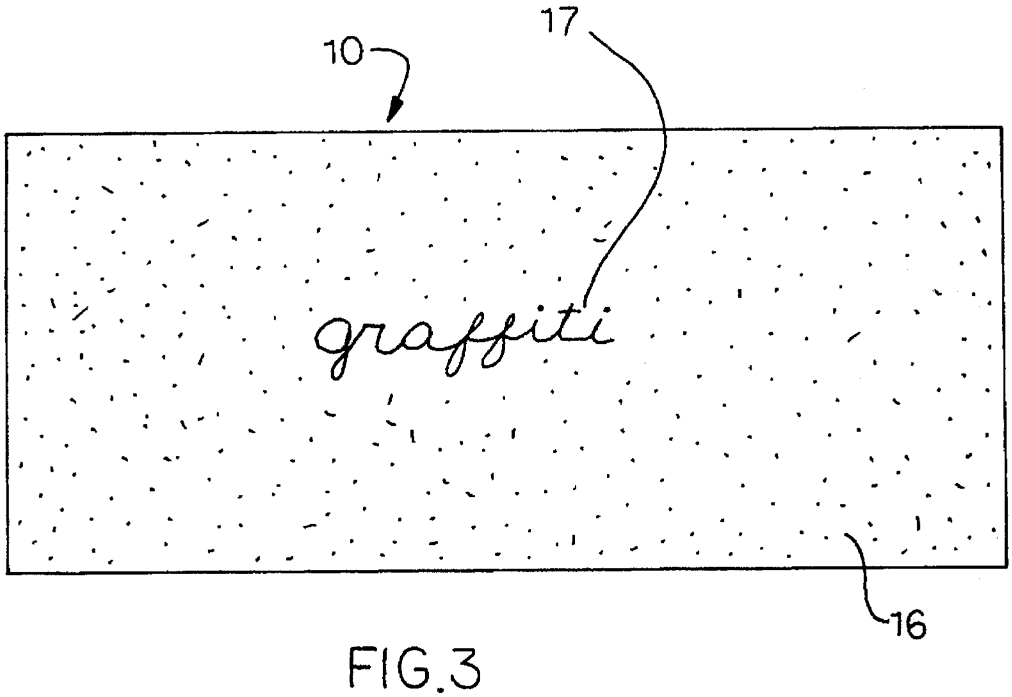
FIG. 3 is the wall of FIG. 2, completely covered with multicolor paint and defaced with graffiti.
Figure 4:
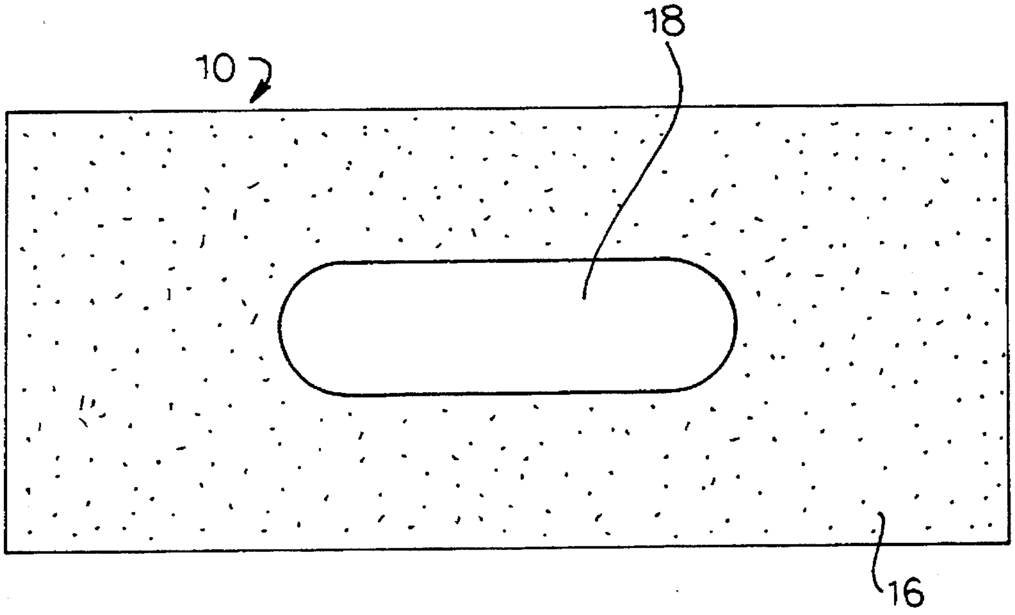
FIG. 4 is the wall of FIG. 3 that has a portion covered with second basecoat.

As shown in FIG. 3, the structure has been constructed to a point that it is able to provide the proper background for any subsequent repairs that are necessary due to visual imperfections that may result in eye pollution, such as graffiti. An example of graffiti has been illustrated in FIG. 3 at 17. A typical example of graffiti would be a black spray paint with an acrylic base. The selection of first basecoat 12 should be made with the anticipation that the basecoat will also be used to cover later applied graffiti. This is illustrated in FIG. 4, a second basecoat 18 has been applied over the area that has been affected by graffiti. If there has been some time which has elapsed between first basecoat 14 and second basecoat 18, there may be some fading of first basecoat 14. However, since first basecoat 14 is a pastel, any fading will not be generally noticeable. If there is an apparent difference, second basecoat 18 can be blended to match the color.

Figure 5:
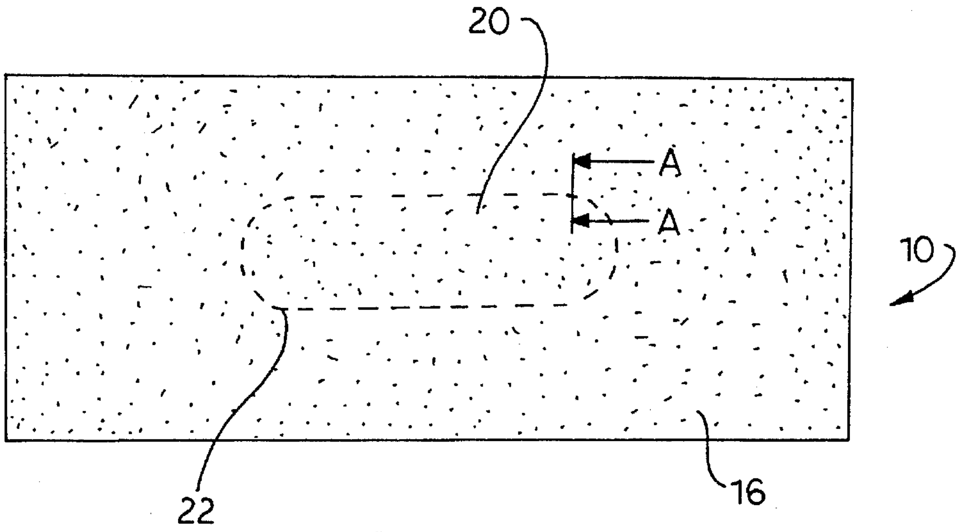
FIG. 5 is the wall of FIG. 4 after a second coat of multicolor paint has been applied to the second basecoat.

FIG. 5 illustrates the structure after a second layer 20 of multicolor paint has been applied over second basecoat 18. Due to the identical mottled appearances of the first multicolor layer 16 and the second multicolor layer 20, the human eye will not tend to perceive any seam where the two areas are joined together. For purposes of illustration, that seam is indicated by phantom line 22. Unlike the prior art, the repaired structure that results from this invention will not exhibit a patchwork of matte and glossy finishes. Nor will there be a contrast in color and texture between the original structure and the repaired structure.

Figure 6:
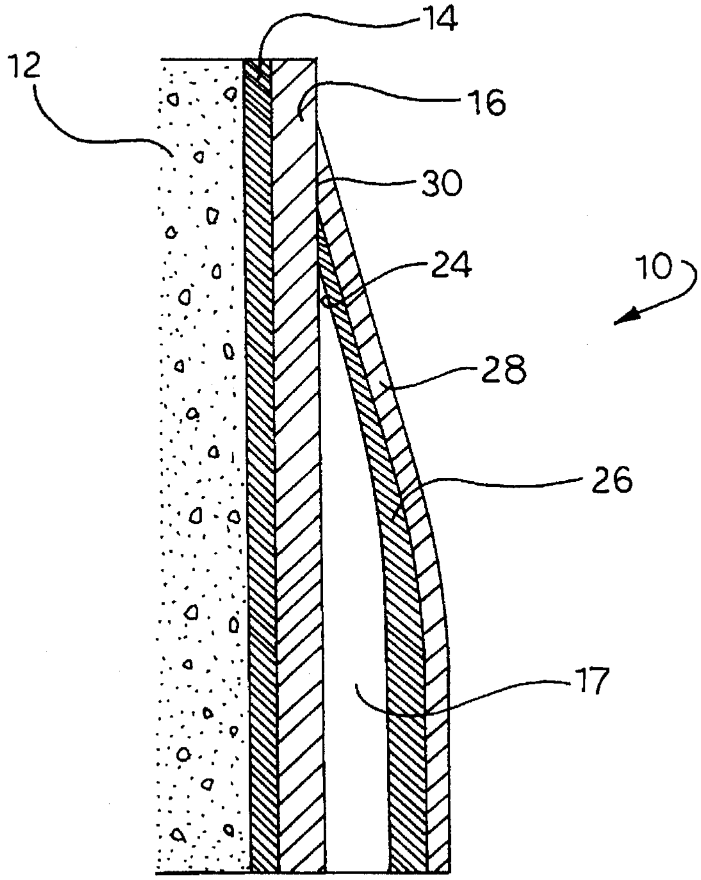
FIG. 6 is an exploded cross-sectional view taken along line A—A' in FIG. 5.

FIG. 6 is a cross-sectional view of FIG. 5, taken along line A—A', which shows wall 10 constructed in accord with the invention. Concrete block 12 has been initially coated with first basecoat 14 of exterior water-based modified acrylic flat latex paint sold by Grow Group, Inc. under the trademark "Meritone Paint PA 750 Series. Prior to the application of first basecoat 14 the paint has been tinted to a pastel hue that will be compatible with the subsequently applied multicolor paint. A colorant such as "Pro-line" sold by Engelhard Exceptional Technologies under that trademark is recommended. For increased adhesion of first basecoat 14 to concrete or any other surface Applicant mixes the paint with a concrete glue or concrete bonder that is normally used in to enhance the bonding characteristics of new concrete to old concrete. In the preferred embodiment of the invention Applicant recommends mixing first basecoat 14 with 1% to 5% concrete glue such as sold by Bordens, Inc. under the trademark "Elmers". The addition of concrete glue to later applied multicolor layers or the second basecoat was not found to be necessary once the superior adhesion of the first basecoat is accomplished. The preferred method of application of first basecoat 14 is spraying the paint using an high air pressure of 1000 to 3000 PSI at the gun. After an appropriate drying of 10–15 minutes at 75° F. the first multicolor layer 16 may be applied. As explained above multicolor layer 16 is applied over first basecoat 14 of "Zolatone 20 using a High Volume Low Pressure (H.V.L.P.). A spray gun such as a Binks Model 2001 with a large fan tip orifice with an internal mixing nozzle is recommended. The multicolor paint is to be applied at a relatively low air pressure of 40–45 PSI as compared to the first basecoat due to the composition of multicolor paint. An air pressure which is excessive will break the color particles, resulting in a loss of the mottled pattern that is characteristic of multicolor paint. The color of the paint to be used for multicolor layer 16 is chosen so that the color is compatible with the hue of first basecoat 14. The color of multicolor layer 16 differs from the color of first basecoat 14 in that the multicolor layer will contain splotches of pigment that are the same color as the basecoat, but a darker shade. The reason for this is that the pigment must be visible against the background of the basecoat in order to present a speckled or mottled appearance to the eye. The drying time for the multicolor layer 16 is about 2 hours and it will be hard dry in about 24 hours.

FIG. 6 shows a layer of graffiti 17 has been subsequently applied over multicolor layer 16. In order to repair the surface of multicolor layer 16 a second basecoat 26 is applied directly over the area affected by the graffiti and the area extending slightly beyond the graffiti. Second basecoat 26 is applied with high pressure in the same manner as first basecoat and can include the addition of concrete glue to improve adhesion. Care must be taken to ensure that second basecoat 26 is tinted to the same color as first basecoat 14. Once second basecoat 26 has dried a second multicolor layer 28 is applied entirely over second basecoat 26 and slightly beyond the perimeter of second basecoat 26, as indicated by reference numeral 30. It should be noted that second multicolor is selected to have a color or hue that is identical to first multicolor layer 16. The method of application of second multicolor layer 28 is the same as that for the first multicolor layer.

An alternative embodiment is disclosed for use in areas where safety at night is a concern. In the presently preferred embodiment, the structure, when constructed according to the invention, will have a matte finish. It does not have a high reflective capability. This factor may be changed by adding a reflective material to the layer of multicolor paint. In the preferred embodiment the material would be glass beads, such as soda lime glass beads as manufactured by Cata phote, Inc., a subsidiary of Graverbel, S.A., with the chemical abstract service number: 65997-17-3.

Another possible material would be glass particles. It should be noted that glass beads or particles cannot be mixed directly with multicolor paint prior to its being sprayed upon a wall. This is because the glass particles will be rendered largely ineffective due to being buried within the paint. To properly apply the glass particles, they must be dispensed from a separate nozzle contemporaneously with the multicolor paint. The multicolor paint strikes the surface in advance of the glass particles providing an adhesive layer for the later striking glass particles. This application technique allows nearly all of the glass particles or beads to remain on the surface of the multicolor paint.

After the application of the multicolor paint over the basecoat it will have an iridescent quality that will readily reflect light. An alternative to glass beads would be to substitute glass particles for the reflective material. Such particles could be produced from the recycling of clear glass. It should be noted that, whenever the first multicolor layer of paint is modified such as the inclusion of reflective material, the identical modification must be made to the multicolor paint used for the second multicolor layer. Accordingly, the present invention should be limited only by the scope of the claims appended hereto.

What I claim is:

1. An exterior wall, comprising:

a structure constructed of concrete, having at least one vertical face;

a first basecoat of an exterior water-based flat paint having a hue covering said vertical face;

a first layer of a multicolor paint having a hue overlaying said first basecoat;

portions of said first multicolor layer being impacted by graffiti;

a second basecoat of an exterior water-based flat paint, having a hue similar to said hue of said first basecoat, covering said portions of said vertical face which have been impacted by said graffiti; and, a second layer of a multicolor paint, having a hue similar to said first layer of said multicolor-paint, applied over said second basecoat; wherein there is no visible seam line around said portions covered with said second layer of multicolor paint.

2. The exterior wall as in claim 1 in which said first layer of multicolor paint and said second layer of multicolor paint contain a reflective material.

3. The exterior wall as in claim 2 wherein said reflective material is composed of glass particles.

4. The exterior wall as in claim 2 wherein said reflective material is composed of glass beads.

5. The exterior wall as in claim 2 wherein said reflective material is composed of recycled glass particles.

6. The exterior wall as in claim 1 wherein said first basecoat contains concrete glue.

7. The exterior wall as in claim 1 wherein said hue of said first basecoat is a pastel.

8. A structure, comprising:

a structure, having at least one visible surface;

a first basecoat of water-based flat paint, having a hue, covering said surface;

a first layer of a multicolor paint, having a hue, overlaying said first basecoat;

a second basecoat of water-based flat paint, having a hue similar to said first basecoat, covering any portions of said first layer of said multicolor paint layer having visual imperfections; and, a second layer of multicolor paint, having a hue similar to said first layer of multicolor paint, applied over said second basecoat; and wherein there is no visible seam line around said portions covered with said second layer of multicolor paint.

9. The structure as in claim 8 in which said first layer of multicolor paint and said second layer of multicolor paint contain a reflective material.

10. The structure as in claim 9 wherein said reflective material is composed of glass particles.

11. The structure as in claim 9 wherein said reflective material is composed of glass beads.

12. The structure as in claim 9 wherein said reflective material is composed of recycled glass particles.

13. An structure as in claim 8 wherein said first basecoat contains concrete glue.

14. The structure as in claim 8 wherein said hue of said first basecoat is a pastel.

15. Method of treating an exterior wall to reduce the visual impact of graffiti, comprising the steps of:

selecting an exterior wall;

cleaning said wall of any loose material;

applying a first basecoat of an exterior water-based flat paint, having a hue, to said wall;

applying a first layer of multicolor paint, having a hue, over said first basecoat;

applying a second basecoat of an exterior water-based flat paint, which is similar in hue to said first basecoat, over any portions of said wall that have been impacted by graffiti; and, applying a second layer of multicolor paint, which is similar in hue to said first layer of multicolor paint, over said second basecoat; and wherein there is no visible seam line around said portions covered with said second layer of multicolor paint.

16. The method of claim 15 which includes the additional step of adding reflective material to said first layer of multicolor paint and to said second layer of multicolor paint.

17. The method of claim 15 which includes the additional step of adding concrete glue to said first basecoat.

* * * * *